United States Patent [19]

Johnson et al.

[11] Patent Number: 5,193,934
[45] Date of Patent: Mar. 16, 1993

[54] IN-SITU THERMAL DESORPTION OF CONTAMINATED SURFACE SOIL

[75] Inventors: Paul C. Johnson, Sugar Land; David A. Weingaertner, Houston, both of Tex.

[73] Assignee: Shell Oil Company, Houston, Tex.

[21] Appl. No.: 705,712

[22] Filed: May 23, 1991

[51] Int. Cl.$^5$ .................................................. B09B 3/00
[52] U.S. Cl. .................................. 405/128; 405/131
[58] Field of Search ............... 405/128, 129, 131, 258; 166/272, 303

[56] References Cited

U.S. PATENT DOCUMENTS

| | | | |
|---|---|---|---|
| 4,376,598 | 3/1983 | Brouns et al. | 405/258 |
| 4,435,292 | 3/1984 | Kirk et al. | 210/747 |
| 4,670,634 | 6/1987 | Bridges et al. | 219/10.41 |
| 4,842,484 | 6/1989 | Koerner et al. | 405/258 |
| 4,982,788 | 1/1991 | Donnelly | 405/131 |
| 4,984,594 | 1/1991 | Vinegar et al. | 134/21 |
| 5,011,329 | 4/1991 | Nelson et al. | 405/128 |
| 5,067,852 | 11/1991 | Plunkett | 405/128 |

Primary Examiner—David H. Corbin

[57] ABSTRACT

An in-situ thermal desorption system utilizes perforated or slotted pipe buried in the soil below the depth of contamination in the soil. The surface of the soil is covered with a layer of permeable insulation (to conserve heat and to provide a gas migration path on top of the soil) and a layer of impermeable material above the insulation. A vapor recovery/treatment system consists of a method of inducing a vacuum between the impermeable layer and the soil surface (e.g., a vacuum pump or an induced draft fan) and a treatment system for the contaminated vapor (e.g., a cold trap, carbon adsorption, or incineration). Fuel and compressed air are fed to a pressurized combustion chamber and combusted, the combustion products flow into the buried pipe and are distributed through the contaminated soil. Heat from the pressurized combustion products causes the organic contaminants within the soil to vaporize, pyrolyze, decompose, or react with oxygen. Contaminants and their by-products are swept away by the combustion products into the vapor recovery/treatment system.

17 Claims, 1 Drawing Sheet

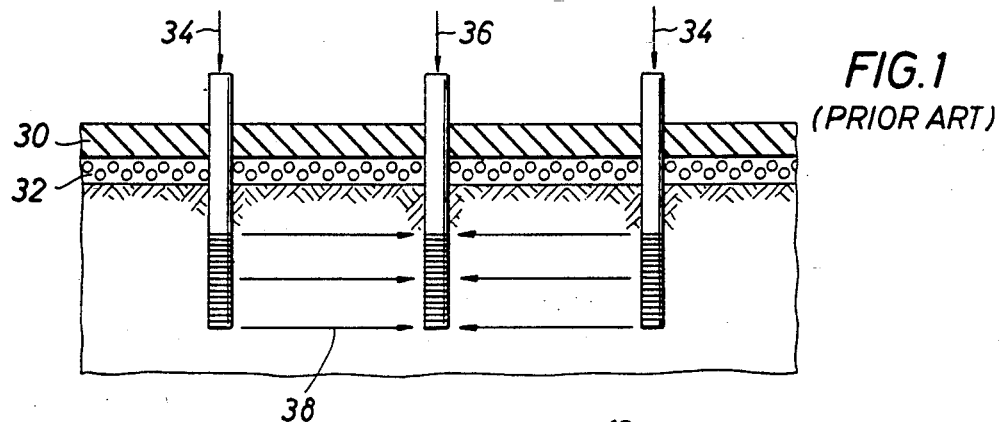
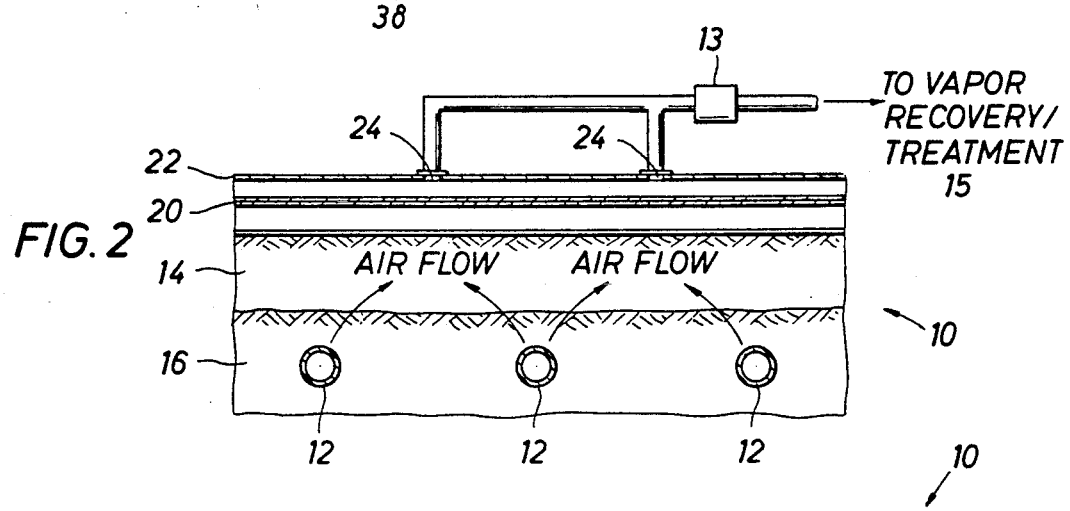
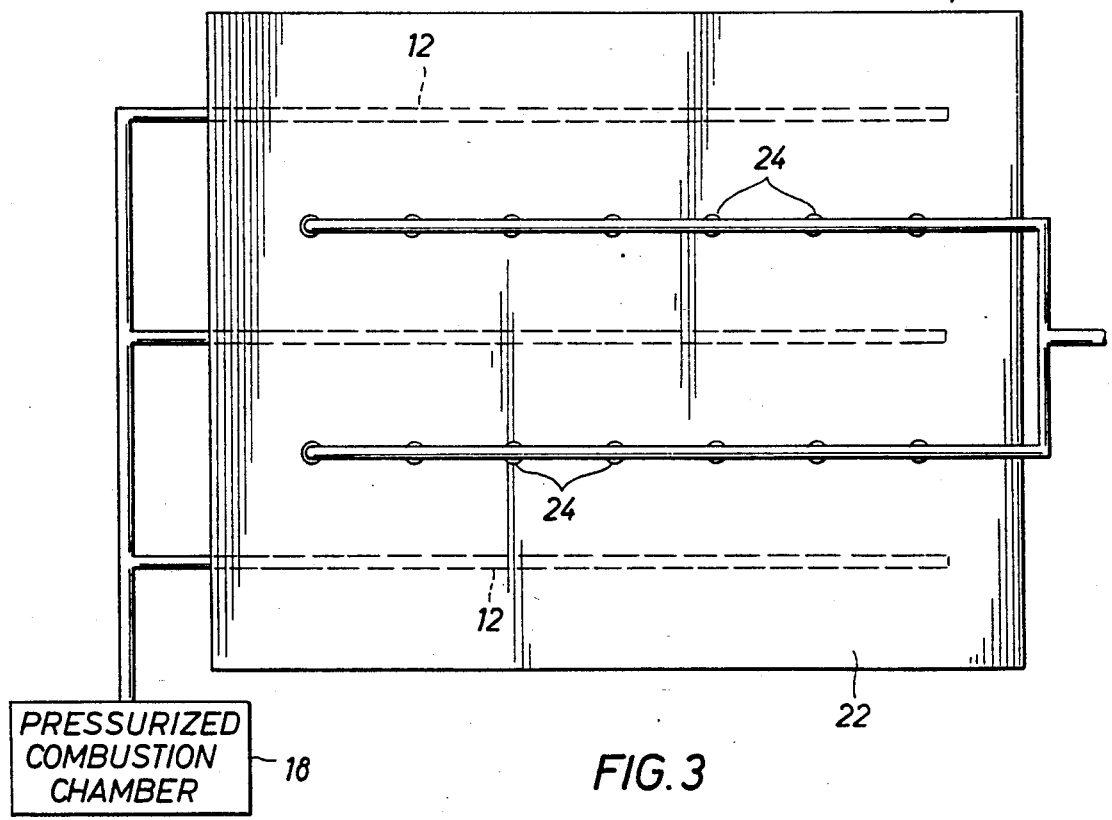

IN-SITU THERMAL DESORPTION OF CONTAMINATED SURFACE SOIL

FIELD OF THE INVENTION

This invention relates to an improved in-situ method for the remediation of soil containing organic or semi-volatile inorganic contaminants. More particularly, the invention relates to a method for the decontamination of soil containing environmentally undesirable organic contaminants, which process employs a more effective removal of such contaminants by thermal desorption. This process is especially useful for the remediation of soils contaminated with non-volatile and semi-volatile organics, such as diesel fuel, aviation and jet fuel, crude oil, PCB's and pesticides and semi-volatile inorganics such as metallic mercury. Such problems may be present at refineries, fuel marketing locations, or chemical plants.

BACKGROUND OF THE INVENTION

A variety of methods have been proposed for the remediation of soil containing organic contaminants. Many of the proposed methods involve removal and subsequent incineration of soil with the attendant difficulties of treatment and/or disposal of off-gases. A major detriment to such processes, however, is the cost of evacuating and transporting the soil which results in a total cost approaching 500 U.S. dollars per ton of soil.

To avoid at least a portion of these costs, several types of in-situ processes have been proposed including vitrification of the soil by electrode heating, steam or hot air heating of the soil through an auger system or through stationary pipes, and radio-frequency or electrical heating of the soil by means of a surface heater.

Brouns et al. U.S. Pat. No. 4,376,598, disclose a vitrification process in which the soil is heated to approximately 1500° C. At or about this temperature the soil forms a glass-like mass which traps the contaminants therein. This process, in reality, is a stabilization process rather than a decontamination process since the soil undergoing treatment has lost its physical and chemical identity. Both an auger system for injecting steam or hot air and a process for steam injection through stationary pipes have been practiced commercially. These methods have a limited use, primarily in the decontamination of soil containing small areas of deep contamination such as localized spills or leakages at service stations. These methods are not as useful when applied to large areas of contaminated soil.

Bridges et al, U.S. Pat. No. 4,670,634, disclose an in-situ thermal process where the thermal energy is supplied by radio-frequency heating. This process is particularly applicable to water-containing soils where the steam generated in the soil serves to strip the organic comtaminants from the soil. A somewhat related process is disclosed by Assignee's U.S. patent application Ser. No. 427,418, filed Oct. 27, 1989, now U.S. Pat. No. 4,984,594 wherein the thermal energy is supplied by a relatively flat heater deployed at the surface of the soil. In this latter process, a lowered pressure is applied at the surface of the soil to remove vapors generated within the soil. This method is somewhat inefficient since significant vapor flow takes place only at the surface of the soil or within a "blanket" placed on the surface of the soil which is more permeable to vapor flow than the soil it covers. It would be of advantage to provide a more effective method of collecting and removing from heated soil the vapors formed when soil contaminated by organic contaminants is heated.

U.S. Pat. No. 4,842,448 issued to Robert M. Koerner et al on Jun. 27, 1989 discloses a method and apparatus for in-situ removal of contaminants from soil comprising a barrier having a permeable inner layer and an impermeable outer layer overlying the contaminated soil and a vacuum system for reducing pressure under the barrier and withdrawing contaminants from the contaminated soil.

In assignee's co-pending application Ser. No. 427,427 Ser. No. 833,569 filed Feb. 7, 1992 which is a continuation of filed Oct. 27, 1989, now abandoned, an in-situ method is disclosed for remediation and decontamination of surface and near-surface soils by electrically heating the soil through electrodes operated at power line frequencies of about 60 Hz. The electrodes are implanted substantially vertically in the soil in a line pattern which allows substantially uniform electrical heating in the region between rows of electrodes. The depth of electrode insertion is substantially equal to the depth of the contamination, but could be deeper or shallower. The process is particularly applicable to soils contaminated at depths of up to about 30 meters. The electrodes are hollow and perforated below the surface to allow application of a vacuum to the soil through the electrodes. The electrodes are also equipped with provision for electrical connection and vacuum line connection, and also with the capability to be sealed to a barrier that is impermeable to gases, such as a flexible sheet.

U.S. Pat. No. 4,435,292 discloses a portable system which can be installed at an area where a contaminating spill has occurred. After the area of the contamination has been determined, perforated pipes are inserted into the ground. Some of the wells are pressurized and others are evacuated simultaneously so as to increase the transfer of a flushing fluid through the soil thereby accelerating the decontamination process and preventing migration of the contaminant into other areas. Since the system is a closed system, the contaminated liquid taken off in the evacuation side of the circulating system is bypassed in whole or in part to a portable processing plant wherein the contaminants are removed.

And, in Assignee's co-pending application Ser. No. 559,771 filed Jul. 30, 1990 now U.S. Pat. No. 5,076,727, moist warm air, from a vapor treatment system is injected into wells which are screened (perforated) only at the contaminated depth forcing vapor flow only through the contaminated region. Between the injection wells is an extraction well which is also screened only at the contaminated depth. A vacuum is drawn on the extraction well through the contaminated soil, thereby entraining some of the contaminants. The contaminated, flushing vapor is then treated and recycled. A microwave/radio frequency (MW/RF) heating system heats the earth's surface and the contaminated soil, thereby enhancing volatilization of the contaminants and their removal via the vapor flushing system. By screening the wells only through the contaminated zone and maintaining the contaminated soil zone in a moist state, the entire energy of the system is focussed on the contaminated region.

In Assignee's copending application Ser. No. 627,479, filed Dec. 14, 1990 an in-situ method for removal of contaminants from soil imposes a vacuum on the soil through perforated heater wells that are positioned in the soil. The heater wells heat the soil to elevated temperatures by thermal conduction. The heater wells are permeable to vapors which emanate from the soil when heated and which are drawn towards the heater wells by the imposed vacuum. An impermeable flexible sheeting on the soil surface reduces the amount of air that is being pulled into the heater well from the atmosphere. A thermal insulator covers the soil surface and reduces heat losses from the soil surface. The heater wells are connected to a vacuum manifold for collection of vapors. A heat front moves away from the heater wells through the soil by thermal conduction, and the superposition of heat from a plurality of heater wells results in a more uniform temperature rise throughout the well pattern. Soil contaminants are removed by vaporization, in-situ thermal decomposition, oxidation, combustion, and by steam distillation. The heater wells and the nearby soil are extremely hot and many contaminants drawn into the wells will decompose with a residence time on the order of seconds. The heater well can also be packed with a catalyst that accelerates high temperature decomposition into smaller molecules. Water vapor and remaining contaminants may be incinerated in line or may be collected in a cold trap upstream from the vacuum pump.

Assignee's copending application Ser. No. 07/705,708 filed concurrent herewith for an improved in-situ soil heating process also utilizes a submerged vapor recovery system comprising perforated or slotted pipes buried in the soil below the depth of contamination. A vapor recovery/treatment system is connected to the buried pipe network and includes a method of inducing a vacuum on the buried pipe network and a treatment system for the contaminated vapor. Heat is applied to the soil surface by a relatively flat, surface-conforming, resistance heater.

SUMMARY OF THE INVENTION

An in-situ thermal desorption system utilizes perforated or slotted pipe buried in the soil below the depth of contamination in the soil. The surface of the soil is covered with a layer of permeable insulation (to conserve heat and to provide a gas migration path on top of the soil) and a layer of impermeable material above the insulation. A vapor recovery/treatment system consists of a method of inducing a vacuum between the impermeable layer and the soil surface (e.g., a vacuum pump or an induced draft fan) and a treatment system for the contaminated vapor (e.g., a cold trap, carbon adsorption, or incineration). Fuel and compressed air are fed to a pressurized combustion chamber (5-50 psig) and combusted, the combustion products flow into the buried pipe and are distributed through the contaminated soil. The combustion chamber may use natural gas, gasoline, diesel fuel, etc. and may be operated with excess oxygen, stoichiometric oxygen or sub-stoichiometric oxygen. In a preferred embodiment, excess oxygen is used so that the outlet temperature is in the range of 200°-600° C. Combustion may also be accomplished by a catalytic process. Heat from the pressurized combustion products causes the organic contaminants within the soil to vaporize, pyrolyze, decompose, or react with oxygen. Contaminants and their by-products are swept away by the combustion products into the vapor recovery/treatment system.

BRIEF DESCRIPTION OF THE DRAWINGS

FIG. 1 depicts a copending system for soil remediation.

FIG. 2 depicts in sectional view the apparatus and process of the invention.

FIG. 3 depicts a plan view of the preferred embodiment of the invention.

DETAILED DESCRIPTION OF THE INVENTION

FIGS. 2 and 3 are schematic sectional and plan views of the in-situ soil heating process with sub-surface vapor recovery. Perforated or slotted pipe is buried in the soil preferably below the depth of contamination. The pipe may be buried in a manifold arrangement to minimize the distance from the contaminated soil to the pipe. A pattern of trenches is dug in the contaminated area to the desired depth, such as by a back-hoe, the pipe is laid and connected as desired, then the pipe is buried by back-filling the trenches. The pipe may contain thermocouples to monitor temperature. A vapor recovery/treatment system is fluidly connected to the buried pipe network. The vapor recovery/treatment system consists of a means of inducing a vacuum between the soil surface and an impermeable sheet (e.g. a vacuum pump or an induced draft fan) and a treatment system for the contaminated vapor (e.g. a cold trap, carbon adsorption, or incineration). A flexible insulation which is permeable to gases, is placed on top of the soil. An impermeable sheet with air collection vents is placed on top of the insulation to protect the insulation from the weather and to direct the inlet air vapors to a treatment system. The impermeable sheet is preferably flexible, but may be rigid, and may be silicone rubber, or equivalent, or thin (e.g., 1/16") stainless steel, aluminum, carbon steel, etc. Heat causes the organic contaminants within the soil to vaporize, pyrolyze, decompose, or react with oxygen. The contaminants and their by-products are swept away by the combustion products from the buried pipe network for further treatment or disposal in the vapor recovery/treatment system. The spacing between the buried pipes depends on the permeability of the soil being treated. Although the final temperature required to decontaminate the soil must be determined on a case-by-case basis, it is expected that a soil temperature in the range of 200°-300° C. would be sufficient to decontaminate many contaminated soils. This invention is especially useful for the remediation of contaminated surficial soils (0-4 ft below ground surface). The heat generated in the pressurized combustor is both convected and conducted into the soil. As the soil temperature rises and approaches the boiling point of the contaminants, the contaminants volatilize and flow into the vapor recovery/treatment system. This device is especially suited for the treatment of non-volatile and semi-volatile organic contaminants, such as pesticides, PC8's, diesel fuels, jet fuels, and crude oil. however it is applicable for soil contaminated with a substance that can be oxidized or vaporized at moderate temperatures. The collected vapors are treated in vapor separation means to remove from the vapors collected any environmentally undesirable vapors prior to release of the remaining vapor to the environment.

In somewhat more detail, an area of the surface of soil contaminated with environmentally undesirable organic and/or inorganic contaminants is covered with a vapor-permeable insulating means employed to reduce heat loss from the pressurized combustor to the air above the soil undergoing decontamination. This soil insulating means comprises a vapor-permeable sheet or mat and is constructed of suitable materials which are insulating and yet permit the passage of vapors. Light weight and durability are also desirable characteristics of the soil insulating means. The required thickness of the sheet will depend upon the temperature at which the soil heating is conducted as well as the nature of the surface of the soil. For ease of positioning, a thin sheet is preferred although thicker sheets provide greater strength and better insulation which may compensate for the greater cost. The temperature limits of the impermeable sheet will also affect the choice of insulation thickness.

The temperature to which the soil is heated by transfer of thermal energy from the pressurized combustor through the soil will depend largely upon the operating temperature of the combustor, the treatment time and the moisture content of the soil and the nature of the particular soil contaminants. The treatment mechanism is heated vapor stripping. In soils of relatively low moisture content or which contain organic contaminants of relatively high boiling points it is necessary to employ higher soil heating temperatures. Soil temperatures are limited, in theory, by the flame temperature of the combustor. Practical concerns, such as temperature limits of materials, will limit the maximum temperature to about 800° C. From an economic standpoint a final temperature of approximately 500° C. is more realistic. Many contaminants can be removed by temperatures of from 150°-300° C. In the case of some soil contaminants, the contaminant will not readily vaporize under the applied thermal energy but will decompose to form gaseous products such as carbon dioxide and water which, in effect, "removes" the contamination by means of its destruction.

When produced, the sub-surface vapors flow upwardly through the earth and are drawn to the vapor collection means. Typically, a series of horizontal perforated pipes extends through the earth below the contaminated soil and terminates in a manifold which connects to the pressured combustor. This flow of vapor through the contaminated soil in a generally vertical direction to the surface serves to promote even heating throughout the soil and provides for more uniform and more efficient decontamination of the soil. The flow of vapor vertically through the contaminated soil is encouraged by pressure reducing means, typically a vacuum pump, acting in cooperation with the vapor collection manifold means to lower the pressure between the soil surface and the impermeable sheet. The reduced pressure serves to facilitate the desired flow of vapors. The vapor collection means is operated without external heating means; however its temperature will increase as the high temperature gases come through. The number and location of the vapor collection vents can be varied but there must be at least one vapor collection vent and generally there will be a plurality of vapor collection vents.

The pressure reducing means is typically a vacuum pump or aspirator connected to the manifold of one or more of the vapor collection vents. The pressure reduction means is positioned at a location external to the impermeable sheet and is connected to the vapor collection means by at least one conduit which is typically flexible. The precise pressure to which the pressure reducing means lowers the ambient pressure at or near the vapor collection means is not critical and pressures from about 2 psia to about 14.5 psia may be satisfactory.

Also, in line with the vapor collection means and the pressure reducing means are vapor separation means which serve to separate the environmentally undesirable vapors from those vapors which may be released into the atmosphere without substantial adverse environmental consequences. This may be accomplished by thermal incineration. In another embodiment, the vapor separation means is a scrubber or an adsorber which serves to remove by physical methods the undesirable vapor components. In yet another embodiment the vapor separation means comprises a catalyst bed which serves to decompose the contaminant vapors passing through the bed into vapors which can be released into the atmosphere without adverse effect. The scrubber, usually a recirculating liquid scrubber, or the adsorber, which is often a bed of activated carbon, is located at a position such that the vapors from the vapor collection means pass through this embodiment of the vapor separation means after collection by the vapor collection means and before or after passage through the pressure reduction means. The scrubber or adsorber is operated at a moderate temperature e.g., from about 0° C. to about 70° C., and it may be necessary to cool the vapors leaving the vapor collection means before entering either of these illustrative vapor separation means. In an alternate embodiment, the vapor separation means is a catalytic degrader serving to remove by chemical degradation the undesirable components of the collected vapors. Such a catalytic unit is operated at an elevated temperature, e.g., from about 200° C. to about 400° C., and the catalytic bed is typically an inorganic oxide such as aluminum oxide or an iron oxide or one of the class of inorganic oxides commonly referred to as clay. The catalytic degrader is suitably located such that the contact with the vapors undergoing separation will occur after exiting the vapor collection means and before or after passing through the pressure reduction means. Alternatively, however, the catalytic degradation bed may be positioned within the vapor collection means by placing a catalytic bed in the vertical passage of the vapor collection means to chemically degrade the contaminant vapors as collected at a sub-surface location. The vapor separation means may be a combination of any of these devices. By any embodiment of the vapor separation means, an environmentally acceptable vapor is obtained which may then be released to the atmosphere.

FIG. 1 illustrates the process of the invention of Assignee's copending application Ser. No. 675,377, filed Mar. 26, 1991, now U.S. Pat. No. 5,114,497. The soil is covered by vapor-impermeable insulation 30 and a relatively flat heater 32. Heat passes into the soil from the heater but heat is also transferred, to a major extent, to locations below the surface of the soil through vertical soil-free passages 34. The heat serves to vaporize and/or decompose soil contaminants, initially at or near the passages 34. The gaseous contaminants or decomposition products thereof pass horizontally through the soil in the direction indicated by the arrows 38 toward a vapor collector 36 where the pressure has been reduced by a vacuum pump (not shown) attached to the upward end of the collector 36. As the vapors flow horizontally through the soil they serve to transfer heat and to more uniformly heat the soil which results in more uniform and more complete decontamination of the soil being treated. The vapors collected flow upwardly through the vertical passage 36 and through the openings in the heater 32 and insulation 30. Before or after exiting the vapor collector, the vapors are treated, physically or chemically, to remove the environmentally undesirable vapors by a vapor separator (not shown).

Referring now to FIGS. 2 and 3, a schematic of the present invention of an in-situ thermal desorption system is shown generally at 10. Perforated or slotted pipe 12 is buried in the clean soil 16 below the depth of contaminated soil 14. The pipes 12 may be buried in a manifold arrangement to minimize the distance from the contaminated soil 14 to the pipes 12. The spacing between the buried pipes 12 depends upon the permeability of the soil 14 being treated. The surface of the soil 14 is covered with a layer of permeable insulation 20 (to conserve heat and to provide a gas migration path on top of the soil) and a layer of impermeable material 22. The vapor recovery/treatment system consists of a means 13 for inducing a vacuum under the impermeable layer 22 (e.g. a vacuum pump or an induced draft fan) and a treatment system 15 for treating the contaminated vapor (e.g. a cold trap, carbon adsorption, or incineration). Fuel and compressed air are fed to a pressurized combustion chamber 18 and combusted. The combustion products flow into the buried pipe 12 at pressures of about 5 to 50 psig and temperatures of about 200° to 500 ° C. and are distributed through the contaminated soil 14. Heat causes the organic contaminants within the soil 14 to vaporize, pyrolyze, decompose, or react with oxygen. The contaminants and their by-products are swept away by the combustion products into the vapor recovery/treatment system 13, 15. Although the final temperature required to decontaminate the soil 14 must be determined on a case by case basis, it is expected that soil temperatures of about 200°–300° C. would be sufficient to decontaminate many contaminated soils. Once the soil 14 reaches the final temperature, compressed air may be distributed through the pipe system 12 to flush out any remaining combustion products and to aid in cooling. The direction of flow may be reversed in an optional cooling step.

This invention is superior to that taught by the prior art because convection aids in the transfer of heat to the soil because gas flow is parallel to heat flow. Thus, decontamination of a given site could proceed in less time with less energy required since convection will aid in homogenizing the temperatures throughout the soil.

Various modifications of the present invention will be apparent from the above description which is not intended to be limiting.

What is claimed is:

1. An apparatus for the remediation of soil contaminated with contaminants comprising:
   vapor permeable insulating means placed on the surface of the contaminated soil;
   vapor impermeable means covering said insulating means, said vapor impermeable means having at least one opening therein;
   hot vapor distribution means, comprising a pipe having openings along its length, said pipe being buried below and essentially horizontal to said contaminated soil;
   means for forcing hot gaseous fluids through said pipe;
   pressure reducing means connected to said opening in said vapor impermeable means and acting in cooperation with said distribution means to collect at reduced pressure and above the surface of said contaminated soil the vapors generated by said distribution means; and
   separation means for removing from said collected vapors the environmentally undesirable portions thereof.

2. The apparatus of claim 1 wherein said contaminants are organic.

3. The apparatus of claim 2 wherein said separation means is an incinerator.

4. The apparatus of claim 2 wherein said separation means is a cold trap.

5. The apparatus of claim 2 wherein said separation means is a recirculating liquid scrubber.

6. The apparatus of claim 2 wherein said separation means is an adsorber comprising a bed of activated carbon.

7. The apparatus of claim 2 wherein said separation means is a catalytic degrader.

8. The apparatus of claim 2 wherein said distribution means is a perforated pipe.

9. The apparatus of claim 2 wherein said distribution means is a slotted pipe.

10. The apparatus of claim 2 wherein said distribution means is a perforated pipe and said separation means is an incinerator.

11. A process for the remediation of soil containing contaminants which comprises the steps of:
   burying a pipe below the contaminated soil and essentially horizontal thereto, said pipe having openings along its length;
   applying thermal energy to said contaminated soil by forcing hot gaseous fluids through said pipe;
   forcing said thermal energy through said contaminated soil and toward the surface;
   collecting the contaminated vapors resulting from the application of said thermal energy at locations above said contaminated soil said collecting being performed at reduced pressure;
   separating the environmentally undesirable portion of said collected vapors; and
   passing the remainder of said collected vapors to the atmosphere.

12. The process of claim 11 wherein said contaminants are organic.

13. The process of claim 11 further including the step of placing a vapor permeable insulating cover over the surface of said contaminated soil.

14. The process of claim 11 further including the step of placing a vapor impermeable cover over the surface of said contaminated soil.

15. The process of claim 13 further including the step of placing a vapor impermeable cover over said vapor permeable insulating cover.

16. The process of claim 14 wherein said reduced pressure is obtained by sealably connecting a vacuum pump to an opening in said vapor impermeable cover.

17. The process of claim 15 wherein said reduced pressure is obtained by sealably connecting a vaccum pump to an opening in said vapor impermeable cover.

* * * * *